Jan. 27, 1970    C. E. BRICKER ET AL    3,491,860

BRAKE DISC WITH YIELDABLE REGISTER

Filed March 22, 1968

INVENTORS
CARL E. BRICKER
KENNETH P. HILLEGASS
ALBERT W. COOK

Oldham & Oldham
ATTORNEYS

United States Patent Office 3,491,860
Patented Jan. 27, 1970

3,491,860
BRAKE DISC WITH YIELDABLE REGISTER
Carl E. Bricker, Cuyahoga Falls, Kenneth P. Hillegass, Copley, and Albert W. Cook, Tallmadge, Ohio, assignors to The Goodyear Tire & Rubber Company, Akron, Ohio, a corporation of Ohio
Filed Mar. 22, 1968, Ser. No. 715,331
Int. Cl. F16d 65/12
U.S. Cl. 188—218                                         5 Claims

ABSTRACT OF THE DISCLOSURE

A brake disc incorporating at least one friction surface and registered through a central aperture to a mounting axle, or the like, wherein the material or surface area defining the aperture is constructed to permanently yield upon compressive stress caused by thermal shrinkage of the brake disc during operation. Essentially, this construction contemplates providing a thin wall section adjacent the aperture, which section permanently yields under such stresses. The purpose of the invention is to facilitate removal of such brake discs from the axle or the like for replacement.

---

Heretofore, it has been known that registered type brake discs are used to maintain concentricity and balance of the disc with relation to the mounting axle. However, such discs have been subject to shrinkage in diameter due to thermal stresses during use. This shrinkage causes conventional discs to bind upon the mounting register, and makes replacement of discs upon wear an extremely expensive and time consuming job.

Therefore, the general object of the invention is to provide a disc structure which will yield around the register when the disc shrinks to thereby relieve the binding force making removal of such discs a very simple and expedient job.

The aforesaid object of the invention is achieved by providing a metallic brake disc having a center aperture adapted to register and mount to an axle or the like stabbed through the aperture wherein the structure of the disc in the area adjacent the aperture differs from that structure of the remainder of the disc by being made to permanently yield upon shrinkage of the diameter of the disc under thermal stresses.

For a better understanding of the invention reference should be had to the accompanying drawings wherein.

Figure 1:
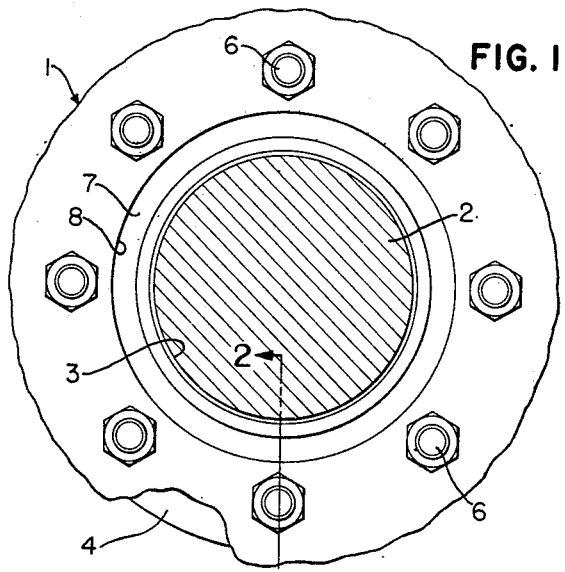
FIG. 1 is an enlarged, broken-away, side elevational view of a disc incorporating the objects of the invention and mounted in registration to an axle.

With reference to the form of the invention illustrated in the drawings, the numeral 1 indicates generally a brake disc which is mounted in registration to an axle 2 by stabbing the axle through aperture 3 of the disc 1. In this structural setup, the registration of the disc 1 to the axle 2 is accomplished by close fitting tolerance of aperture 3 around the axle. A flange 4 is affixed to the axle 2 by weld 5. With holes in the disc 1 lined up with holes in the flange 4 bolts 6 secure the disc 1 in place. The bolts 6 have some play in their aligned holes and only serve to maintain the registration provided by the aperture 3.

As pointed out above, heretofore with this type of close fitting tolerance of the aperture 3 around the axle or other mounting surface, the large amounts of heat generated during braking makes the discs tend to shrink in diameter due to thermal stresses causing a compression of the aperture around the axle and subsequent difficulties in removal of the brake disc for replacement.

Thus, the objects of the invention are achieved by providing some means to allow the material of the brake disc immediately adjacent the aperture to permanently yield upon such shrinkage tendencies so that large compressive forces around the aperture are eliminated and thus removal of the brake disc after use is very simple and efficient to accomplish.

Figure 2:
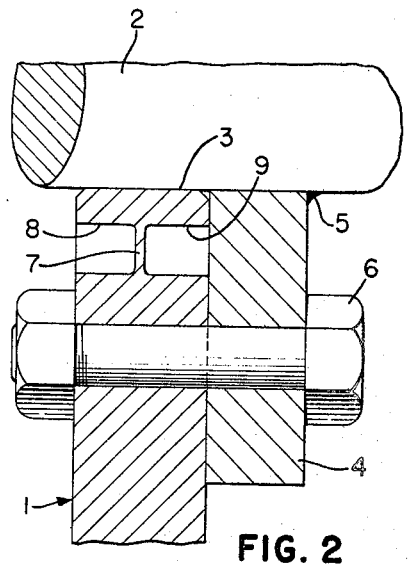
FIG. 2 is an enlarged, cross sectional view of the yieldable register of the disc as taken on line 2—2 of FIG. 1.

A preferred embodiment of the invention is illustrated in FIG. 2 which shows that a thin wall section 7 substantially centrally positioned to support the aperture surface 3 is achieved by providing two annular recesses 8 and 9 in substantially opposed relationship to define the thin wall section 7. The invention contemplates that the thin wall section 7 should be at least about 0.03 inch in thickness and preferably about 0.06 inch, but not more than 0.09 inch. Also, it is somewhat critical the length or radial distance of thin wall section 7, and this should fall within about 0.12 inch to about 0.38 inch.

Figure 3:
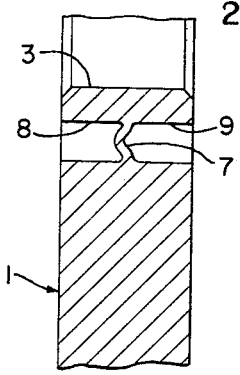
FIG. 3 illustrates the disc of FIGS. 1 and 2 in a partially crushed, permanently yielded condition.

FIG. 3 illustrates the type of crushing or yielding deformation which the thin wall section 7 will take upon the thermal shrinkage of the brake disc, and how this still provides a highly accurate register of the aperture 3, but greatly facilitates removal of the disc.

Figure 4:
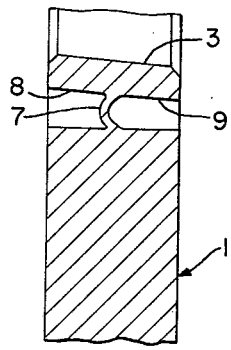
FIG. 4 illustrates the disc of FIG. 1 in a partial registered condition showing how the yieldable web assumes a conical shape upon heat shrinkage.

FIG. 4 illustrates the disc in a partially registered relationship showing how the thin wall section 7 will actually allow the register to bend to a conical shape upon thermal shrinkage. Of course, the conically shaped registration aperture is easily removed from the axle.

Figure 5:
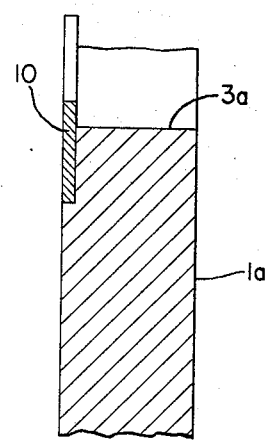
FIG. 5 is an enlarged, cross sectional view of a modified embodiment of the invention.
Figure 6:
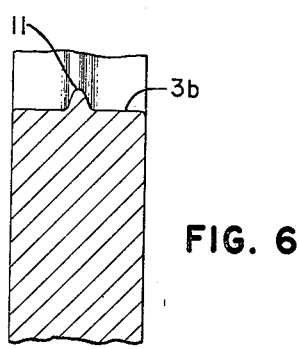
FIG. 6 is an enlarged, cross sectional view of another modified embodiment of the invention.

FIGS. 5 and 6 illustrate modified embodiments of the invention, each designed to provide the same yielding relationship upon the thermal shrinkage. In FIG. 5 an annular insert ring 10 is mounted in recessed relationship adjacent the aperture 3a to extend radially inwardly to provide a thin-walled, yieldable metallic surface. Preferably it is desirable that the ring 10 be made from a softer metal than the metal of the disc 1a. FIG. 6 illustrates a modification wherein a raised rib 11 is machined onto the surface of the aperture 3b which extends radially inwardly and because of its thin-walled nature will yield in much the same manner as thin wall 7 of the modification of FIGS. 2 and 3.

Thus, it should be understood that the objects of the invention are achieved by modifying the structure of the disc adjacent the registering aperture so as to allow permanent yielding of the aperture adjacent the disc upon thermal shrinkage, while still maintaining the registry of the disc with relation to a mounting axle or the like.

While in accordance with the patent statutes only the preferred embodiments of the invention have been illustrated and described in detail, it is to be particularly understood that the invention is not limited thereto or thereby, but that various modifications may be made to still fall within the objects of the invention.

What is claimed is:

1. In combination, a mounting register, a flange mounted to the register and extending radially outwardly therefrom, a flat, circularly shaped brake disc having a centrally positioned aperture therethrough slidably received in close filling tolerance over the register and abutting against the flange, bolt means connecting the disc to the flange said disc including a friction surface on at least one face of the disc, and which is characterized by that portion of the disc immediately adjacent the aperture being constructed to include at least one thin walled and structurally weakened section which is permanently set under less compressive stress than the remainder of the disc, so as to substantially eliminate compressive forces around the aperture, and where such thin wall section is positioned radially inwardly of all bolt means connecting the disc to the flange through which torque must be carried, and radially inwardly of all torque carrying portions of the disc.

2. A metallic brake disc having a central aperture adapted to register with and mount to an axle or the like stabbed through the aperture, means through which torque is transmitted to hold the disc to the axle or the like, and at least one face of said disc acting as a friction surface which face is radially outward of said means through which torque is transmitted wherein the structure of the disc in the area adjacent the aperture and radially inward of the means through which torque is transmitted includes at least one thin walled section which differs from that structure if the remainder of the disc by being made to more readily permanently set than the remainder of the disc upon shrinkage of the diameter of the aperture under thermal stress.

3. A combination according to claim 2 where the thin walled section is formed by a pair of opposed annular recesses extending around and adjacent to the aperture and substantially normal to the faces of the disc which recesses bottom out to define a thin wall section therebetween.

4. A combination according to claim 2 where the thin wall section is formed by a raised rib extending radially inwardly from the base defining the aperture into the aperture and adapted to engage the mounting register.

5. A combination according to claim 2 where the thin wall section is formed by a thin annular ring mounted in recessed relation to the disc to surround the aperture which extends radially inwardly a short distance into the aperture, and said ring adapted to engage the mounting register.

References Cited

UNITED STATES PATENTS

| | | |
|---|---|---|
| 2,800,982 | 7/1957 | Cottrell. |
| 3,084,768 | 4/1963 | Goode. |
| 3,378,114 | 4/1968 | Hollins. |

FOREIGN PATENTS

| | | |
|---|---|---|
| 1,309,093 | 10/1962 | France. |
| 1,081,284 | 8/1967 | Great Britain. |

MILTON BUCHLER, Primary Examiner

GEORGE E. A. HALVOSA, Assistant Examiner

U.S. Cl. X.R.

192—107